US011777420B2

(12) United States Patent
Hofmann et al.

(10) Patent No.: US 11,777,420 B2
(45) Date of Patent: Oct. 3, 2023

(54) SUBMODULE AS A PARALLEL SERIAL FULL BRIDGE FOR A MODULAR MULTILEVEL CONVERTER

(71) Applicant: Siemens Aktiengesellschaft, Munich (DE)

(72) Inventors: Viktor Hofmann, Bayreuth (DE); Mark-Matthias Bakran, Erlangen (DE); Sebastian Semmler, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/928,133

(22) PCT Filed: Apr. 30, 2021

(86) PCT No.: PCT/EP2021/061417
§ 371 (c)(1),
(2) Date: Nov. 28, 2022

(87) PCT Pub. No.: WO2021/239388
PCT Pub. Date: Dec. 2, 2021

(65) Prior Publication Data
US 2023/0216427 A1 Jul. 6, 2023

(30) Foreign Application Priority Data
May 29, 2020 (EP) .................................. 20177503

(51) Int. Cl.
*H02M 7/483* (2007.01)
*H02M 1/00* (2006.01)
*H02M 1/084* (2006.01)

(52) U.S. Cl.
CPC ....... *H02M 7/4835* (2021.05); *H02M 1/0074* (2021.05); *H02M 1/084* (2013.01)

(58) Field of Classification Search
CPC ........................... H02M 7/483; H02M 7/4835
See application file for complete search history.

(56) References Cited

U.S. PATENT DOCUMENTS 9,929,634 B2 * 3/2018 Nami ................. H02M 7/4835
2014/0218991 A1 8/2014 Chen et al.
(Continued)

FOREIGN PATENT DOCUMENTS

DE    101 03 031 A1    7/2002
EP    2 765 602 A1    8/2014
(Continued)

OTHER PUBLICATIONS

Samadaei, Emad et al:, "A Square T-Type (ST-Type) Module for Asymmetrical Multi Level Inverters", IEEE Transactions on Power Electronics, Institute of Electrical and Electronics Engineers, vol. 33, No. 2, pp. 987-996, XP011672516, ISSN: 0885-8993, DOI: 10.1109/TPEL.2017.2675381; 2018.
(Continued)

*Primary Examiner* — Gary A Nash
(74) *Attorney, Agent, or Firm* — Henry M. Feiereisen LLC

(57) ABSTRACT

A submodule for a modular multilevel converter has nine semiconductor switches that can be switched off, four capacitors, six network nodes, and two terminals. The components are mounted such that different voltages are generated between the terminals of the submodule by controlling the semiconductor switches. This arrangement of components substantially improves the behavior of the converter and of the submodule in the event of a fault.

6 Claims, 3 Drawing Sheets

(56) References Cited

U.S. PATENT DOCUMENTS

2015/0124506 A1* 5/2015 Sahoo .................. H02M 5/225
363/126
2019/0052187 A1* 2/2019 Geske ................ H02M 7/4835

FOREIGN PATENT DOCUMENTS

| WO | WO-2019063078 A1 * | 4/2019 | |
|----|---------------------|--------|---|
| WO | WO 2019-149367 A1 | 8/2019 | |
| WO | WO-2019149367 A1 * | 8/2019 | .......... H02M 1/0095 |

OTHER PUBLICATIONS

Samadaei, Emad et al:, "A 13-Level s Module (K-Type) With Two DO Sources for Multilevel Inverters", IEEE Transactions on Industrial Electronics, IEEE Service Center, vol. 66, No. 7, pp. 5186-5196, XP011712557, ISSN: 0278-0046, DOI: 10.1109/TIE.2018.2868325; 2019.

Vijeh, Mahdi et al.:, "A General Review of Multilevel Inverters Based on Main Submodules: Structural Point of View", IEEE Transactions on Power Electronics, Institute of Electrical and Electronics Engineers, vol. 34, No. 10, pp. 9479-9502, XP011733522, ISSN: 0885-8993, DOI: 10.1109./TPEL.2018.2890649; 2019.

PCT International Search Report and Written Opinion of International Searching Authority dated Jun. 29, 2021 corresponding to PCT International Application No. PCT/EP2021/061417 filed Apr. 30, 2021.

* cited by examiner

FIG 3

| No | S1/S2 | S3 | S4/S6 | S5 | S7 | S8/S9 | $U_{SM}$ |
|---|---|---|---|---|---|---|---|
| 1 | 1 | 0 | 0 | 1 | 0 | 1 | $U_{C1} + U_{C2}$ |
| 2 | 1 | 0 | 0 | 1 | 1 | 0 | $U_{C1}$ |
| 3 | 0 | 1 | 0 | 1 | 0 | 1 | $U_{C2}$ |
| 4 | 1 | 0 | 1 | 0 | 0 | 1 | 0 |
| 5 | 0 | 1 | 0 | 1 | 1 | 0 | 0 |
| 6 | 0 | 1 | 1 | 0 | 0 | 1 | $-U_{C1}$ |
| 7 | 1 | 0 | 1 | 0 | 1 | 0 | $-U_{C2}$ |
| 8 | 0 | 1 | 1 | 0 | 1 | 0 | $-U_{C1} - U_{C2}$ |
| Block | 0 | 0 | 0 | 0 | 0 | 0 | $U_{C1} + U_{C2}$ $-U_{C1} - U_{C2}$ |

SUBMODULE AS A PARALLEL SERIAL FULL BRIDGE FOR A MODULAR MULTILEVEL CONVERTER

CROSS-REFERENCES TO RELATED APPLICATIONS

This application is the U.S. National Stage of International Application No. PCT/EP2021/061417, filed Apr. 30, 2021, which designated the United States and has been published as International Publication No. WO 2021/239388 A1 and which claims the priority of European Patent Application, Serial No. 20177503,8, filed May 29, 2020, pursuant to 35 U.S.C. 119(a)-(d).

The invention relates to a submodule for a modular multilevel power converter. The invention further relates to a modular multilevel power converter. Moreover, the invention relates to a method for the operation and a method for the production of a submodule of this type.

A modular multi-level power converter is known from the publication DE 101 03 031 A1. This is also referred to as a modular multi-level converter, MMC or M2C. This type of power converter has a plurality of submodules with which it is possible to generate a stepped output voltage.

The modular multi-level power converter is a converter topology that is suitable in particular for HVDC applications and electrical drives. The basic construction of the multi-phase power converter comprises two converter arms per phase that are embodied in each case as a series connection of numerous submodules. By virtue of the modular construction, a desired voltage form is simulated in a quantized manner by each converter arm in that either a discrete voltage or a terminal short circuit is modulated with each submodule. The submodules render it possible in this case to provide various voltage levels.

Various submodule variants exist. The most common submodule types known at this time are half bridges and full bridges.

The submodules in this case contain semiconductor switches that can be switched off, such as for example IGBTs, IGCTs, GTOs, MOSFETs, etc. In contrast with thyristors, it is not just possible for these semiconductor switches to connect a current but rather it is also possible to disconnect a current. The current can only be disconnected in one current flow direction. In the opposite current flow directions, the semiconductor switches that can be switched off have the behavior of a diode. Either this behavior is already provided by virtue of the construction of the power converter or this behavior is achieved by means of a diode that is arranged in an antiparallel manner with respect to the switching element of the semiconductor switch. Consequently, a semiconductor switch that can be switched off can connect and disconnect a current in a current flow direction and can only conduct in the other current flow direction. It is consequently not possible to disconnect a current in this other current flow direction.

The object of the invention is to improve the submodule of a modular multilevel power converter.

SUMMARY OF THE INVENTION

This object is achieved by a submodule as set forth hereinafter. Moreover, this object is achieved by a modular multilevel power converter as set forth hereinafter. Furthermore, the object is achieved by a method for operating a submodule as set forth hereinafter and also by a method for producing a submodule as set forth hereinafter.

Advantageous embodiments of the invention are disclosed in the dependent claims, The invention is based inter alfa on the knowledge that by virtue of the proposed arrangement of the semiconductor switches and the capacitors it is possible to improve the failure behavior of the submodule and of the modular multilevel power converter. It is possible to define eight switching states of the semiconductor switches and thereby to generate seven different output voltages at the connectors of the submodule. Furthermore, it is possible to achieve a further switching state in which however different voltages prevail at the connectors in dependence upon the current flow direction through the submodule. Consequently, in particular the six first mentioned switching states are particularly advantageous for the regulation and control of the submodules and the modular multilevel power converter.

The circuit is used as a submodule in a modular multilevel power converter. In this case, it is possible to actively connect eight switching states that are relevant for the regular operation and that lead to different output voltages between the two connectors of the submodule. The first and the second capacitor and also the third and the fourth capacitor are in this case always in each case connected in parallel. In order to improve clarity, the modulated voltage of the parallel connection of the first and second capacitor is referred to below as $U_{C1}$ and the modulated voltage of the parallel connection of the third and fourth capacitor is referred to as $U_{C2}$. It is possible to connect the following voltage states between the connectors of the submodule:

positive series connection of the two capacitor parallel connections, corresponds to the sum of $U_{C1}$ and $U_{C2}$, in other words $U_{C1}+U_{C2}$, in each case simple positive capacitor parallel connection, corresponds to $U_{C1}$ or $U_{C2}$, no voltage (terminal short circuit or freewheel), negative capacitor parallel connection, corresponds to $-U_{C1}$ or $-U_{C2}$ and negative series connection of the two capacitor parallel connections corresponds to the negative sum of $U_{c1}$ and $U_{C2}$ in other words $-(U_{C1+}U_{C2})$ These states can all be switched regardless of the current direction, in other words in a bidirectional manner.

The submodule in accordance with the invention can be functionally compared to the series connection of two full bridges. In this case, the same voltage states can be connected between the connectors of the submodule. If the individual semiconductor switches are accordingly dimensioned in the proposed arrangement and in a series connection of the two full bridges, the same semiconductor number results. If it is assumed that in the proposed arrangement and in the series connection of the two full bridges the same capacitor energy is installed, the discharging energy in the event of a semiconductor failure in the arrangement in accordance with the invention is thus halved in magnitude. If a semiconductor switch fails here, at all times only one of the parallel connected capacitors is short circuited. Consequently, also only half of the energy is to be safely controlled in the submodule or power converter.

This failure behavior could likewise be achieved if in the case of the series connection of the full bridges in each case the two submodules are embodied as a parallel connection. In this case, however, at least sixteen switches must be installed with respect to the nine in the arrangement in accordance with the invention. Consequently, the destination of the reduced failure energy, in other words the energy in the event of failure, can be reached with a considerably reduced number of semiconductors and semiconductor actuations. This makes the submodule and thereby the modular multilevel power converter considerably less complex, more cost-effective and easier to control and/or regulate.

The submodule can be constructed in the basic construction from two part-modules since the submodule has a mirror symmetry. It is thereby particularly advantageous to construct the submodule from two part-modules in a particularly simple and cost-effective manner. The part-modules comprise in this case the connectors, the first, third, fourth, fifth, seventh and eighth semiconductor switches, the first and the third capacitor and also the first, third, fourth and the sixth network nodes.

The third, fifth and seventh semiconductor switches are then formed by a parallel connection of in each case one semiconductor switch of the two part-modules with the result that these semiconductor switches can then be dimensioned as smaller, for example with half of the current-carrying capacity.

In the proposed construction, the third semiconductor switch, the fifth semiconductor switch and the seventh semiconductor switch are in each case to be dimensioned for the full current-carrying capacity of the submodule 1. The remaining semiconductor switches are in each case only to be designed to half the current-carrying capacity. Since the third semiconductor switch, the fifth semiconductor switch and the seventh semiconductor switch, in the case of a realization via two part-modules, result as a parallel connection of two semiconductor switches, the semiconductor switches within the part-modules are all only to be designed to half the current-carrying capacity. All the semiconductor switches of the part-module can thereby be designed in a structurally identical manner, Furthermore, the semiconductor switches of the two part-modules are to be actuated identically. Consequently, for the submodule that is constructed from two part-modules it is possible to use only one actuation circuit for the six semiconductor switches and the actuation signals of the control circuit are distributed in parallel on the two part-modules in such a manner that the actuation signals are controlled synchronously.

A network node is to be understood as a branch within an electronic circuit, also referred to as an electronic network. At least three current paths thereby meet at one network node.

The characteristics and advantages can be summarized as follows, By virtue of the symmetrical construction, in particular in the case of the use of the two or more part-modules, two or more parallel current paths result for the current through the submodule, which are fundamental for the present invention. The number of the parallel current paths results from the number of parallel part-modules. In this case, the first capacitor and the second capacitor and also the third capacitor and the fourth capacitor in each case form a parallel connection that is decoupled via diodes. As a consequence, this results in a high availability since even in the event of a failure of a semiconductor and/or of a capacitor the submodule can be further operated. In comparison with an increase in the number of modules so as to achieve a comparable redundancy in the case of simultaneous provision of a comparable voltage via different switching states, considerably fewer semiconductors are required. Simultaneously, it is possible by virtue of the parallel connection of the capacitors to dimension the capacitance of the individual capacitors as smaller, in particular halved in magnitude. In the event of damage, this reduces the destruction potential starting from the capacitors. In other words, failures in a capacitor, as is already described, can be more easily controlled since the stored energies that are present are considerably lower. The proposed construction can furthermore be produced in a fundamentally simpler and more cost-effective manner by virtue of the use of fewer semiconductors. Furthermore, the probability of failure clearly decreases by virtue of the use of fewer semiconductors. This leads to an increased availability of the submodule and the multilevel power converter that is constructed as a result.

BRIEF DESCRIPTION OF THE DRAWING

The invention is further described and explained below with reference to the exemplary embodiments that are illustrated in the figures, in which:

FIG. 3 shows snitching states of the submodule.

DETAILED DESCRIPTION OF PREFERRED EMBODIMENTS

Figure 1:
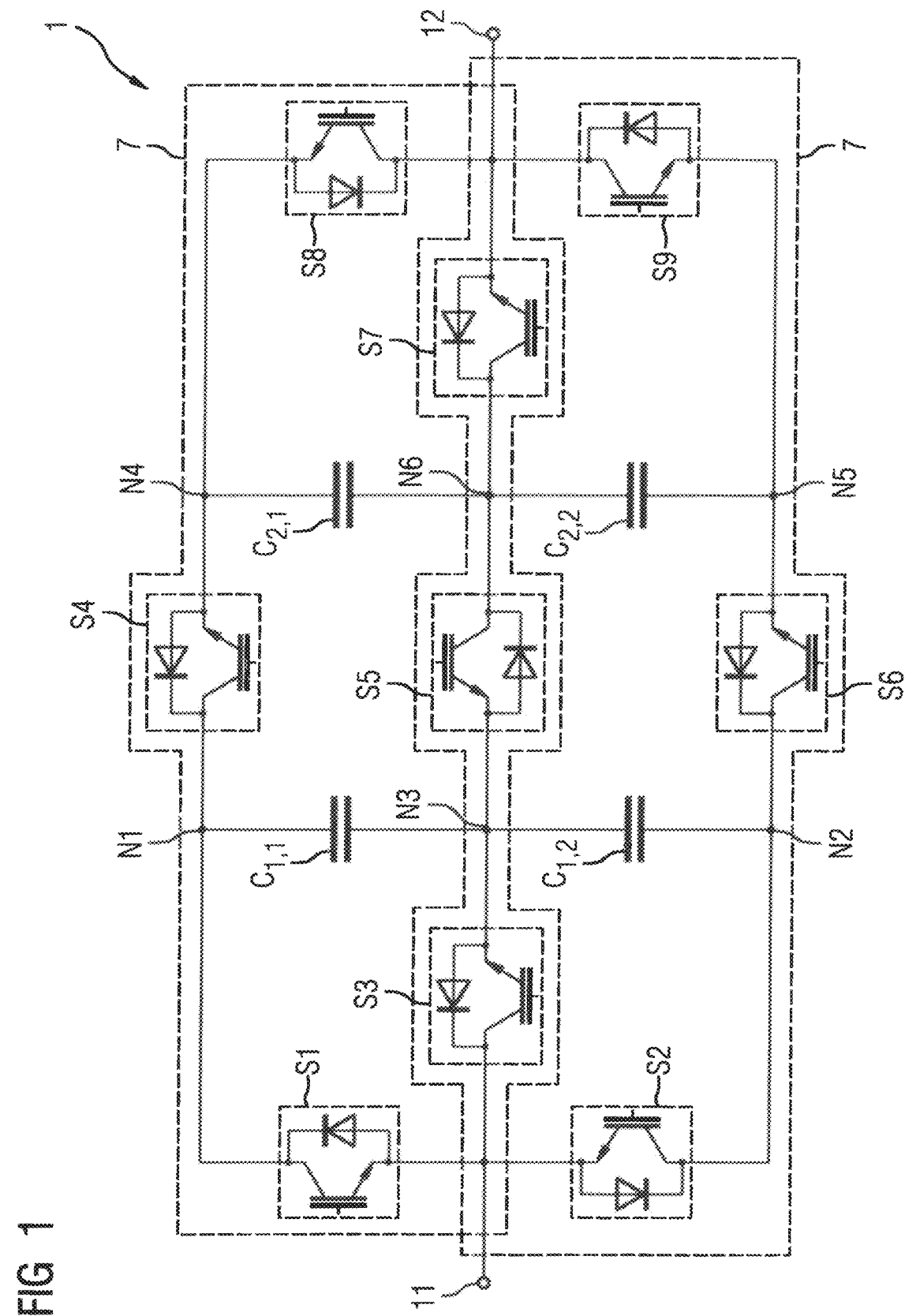
FIG. 1 shows the construction of the submodule in accordance with the invention.

FIG. 1 illustrates an exemplary embodiment of a submodule 1 in accordance with the invention. A component is arranged in each case between the individual network nodes N1 . . . N6. In this case, the individual components are arranged directly between the network nodes N1 . . . N6 and connects the respective two network nodes to one another or one of the network nodes N1 . . . N6 to one of the connectors 11, 12. The voltage between the connectors 11, 12 of the submodule 1 is referred to with $U_{SM}$. In this case, in an advantageous manner the third semiconductor switch S3, the fifth semiconductor switch S5 and the seventh semiconductor switch S7 are dimensioned in each case for the full current-carrying capacity of the submodule 1. The remaining semiconductor switches S1, S2, S4, S6, S8, S9 are to be designed in each case to half of the current-carrying capacity.

It is apparent that the construction of the submodule 1 extends in a mirror-symmetrical manner with respect to an axis that is formed by the connectors 11, 12 of the submodule 1. As a consequence, it is possible to construct the submodule 1 from two identical part-modules 7 that are connected to one another in each case at the connectors 11, 12, at the third network node N3 and at the sixth network node N6. A part-module comprises in this case the connectors 11, 12, the first, third, fourth, fifth, seventh and eight semiconductor switches S1, S3, S4, S5, S7, 38, the first and the third capacitor $C_{1,1}$, $C_{2,1}$ and the first, third, fourth and the sixth network nodes N1, N3, N4, N6. In order to form a submodule 1 from two structurally identical part-modules 7, the two structurally identical part-modules 7 are connected to one another in an electrically conductive manner in each case at the connectors 11, 12, the third network node N3 and the sixth network node N6.

In this case, the third semiconductor switch S3, the fifth semiconductor switch S5 and the seventh semiconductor switch S7 can likewise be designed for half the current-carrying capacity of the submodule 1. The full current-carrying capacity then results from the parallel connection by virtue of the construction of the submodule 1 from the two part-modules 7. As a consequence, it is possible to design all the semiconductor switches within the part-module 7 as identical, in particular with regard to the current-carrying capacity. This increases the common parts and increases the ease of maintenance of the submodule 1. The production of the submodule is also particularly cost-effective and reliable by virtue of the large quantity of common parts in the case of the semiconductor switches S1, ... S9.

Figure 2:
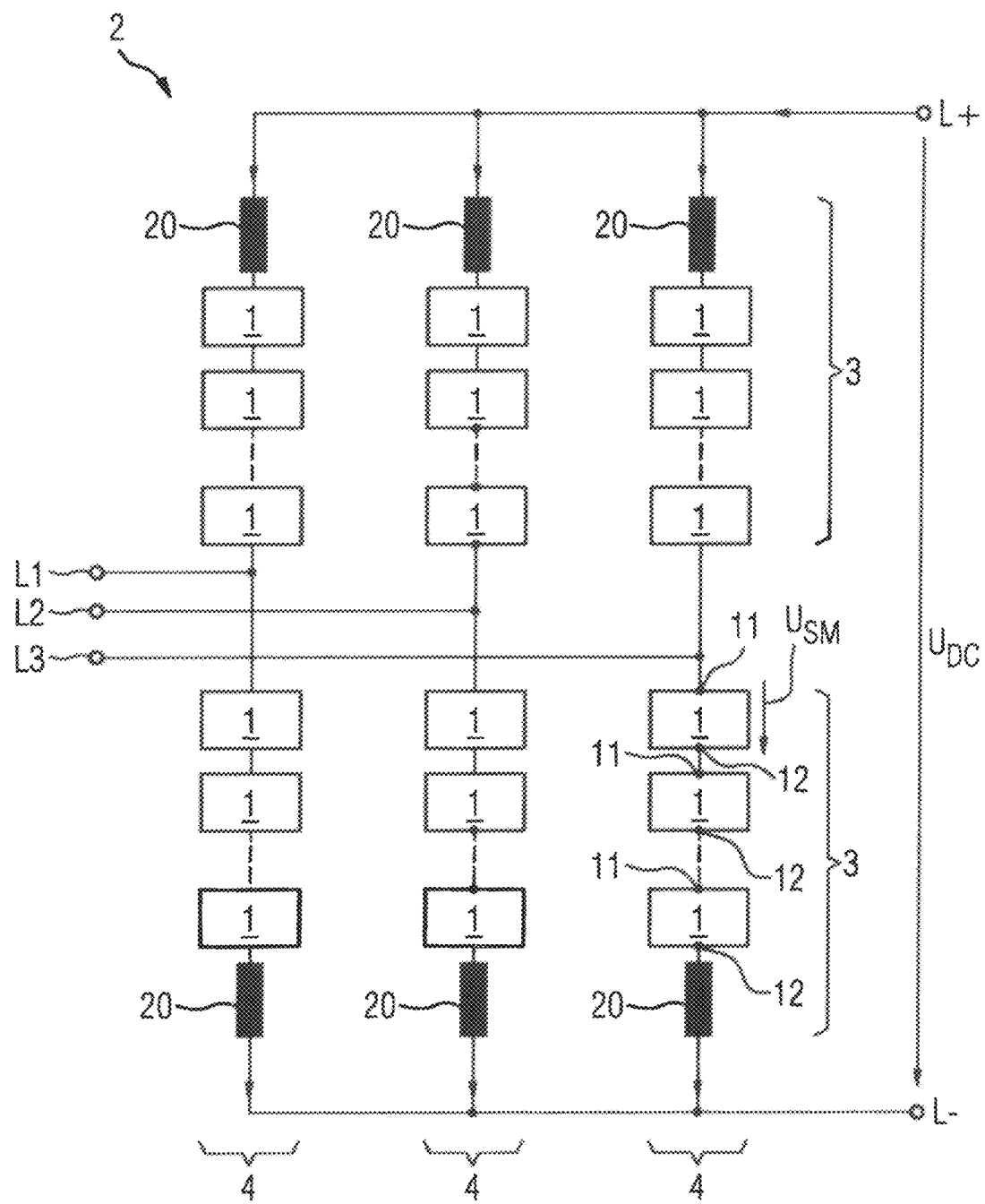
FIG. 2 shows the construction of the modular multilevel power converter.

FIG. 2 illustrates an exemplary embodiment of a modular multilevel power converter 2 that is constructed from the proposed submodules 1. In order to avoid repetitions, reference is made to the description with regard to FIG. 1 and also to the reference characters introduced there. These submodules 1 are arranged in series in their connectors 11, 12, which are only illustrated in one converter arm 3 for the sake of clarity, and said submodules form the converter arm 3. Two converter arms 3 that are arranged in series form the converter phase 4. The connecting point of the converter arms 3 forms the phase connector L1, L2, L3. The converter phases 4 are arranged between the intermediate circuit connectors L+, L−. In order to improve the ability to provide regulation or control, it has proven advantageous to supplement the series connection of the converter arms 3 by inductances 20 that are arranged in series between the converter arm 3 and the respective intermediate circuit connector L+, L−. In each case, the module voltage $U_{SM}$ prevails at the individual submodules 1 and the module voltage results from the switching states of the semiconductor switches S1 . . . S9.

The present exemplary embodiment is designed as a three-phase modular multilevel power converter 2.

FIG. 3 illustrates the possible switching states of the semiconductor switches S1 . . . S9 and the voltage $U_{SM}$ which then results between the connectors 11, 12 of the submodule 1. In order to avoid repetitions, reference is made to the description with regard to FIGS. 1 and 2 and also to the reference characters introduced there. In this case, the first and the second semiconductor switch S1, S2, the fourth and the sixth semiconductor switch S4, S6, the eighth and the ninth semiconductor switch S8, S9 in each case are actuated identically, in other words switched on, which is characterized in the table by a 1, or are switched off, which is characterized by a 0. As a consequence, it becomes clear that only one actuation unit is required for the realization of the submodule 1 from two part-modules 7, since the semiconductor switches that are arranged in a mirror-inverted manner always assume the same switching state.

In the preferred switching states that are numbered consecutively 1 to 8 the submodule voltage $U_{SM}$ results regardless of the current flow direction of the current through the submodule 1. Only the state BLOCK in which all the semiconductor switches S1 . . . S9 are switched off provides different submodule voltages $U_{SM}$ depending on the current flow direction with the result that this state is preferably not used for the control of the submodule 1.

In summary, the invention relates to a submodule for a modular multilevel power converter having:
nine semiconductor switches that can be switched off
four capacitors
six network nodes
two connectors,
wherein the components are arranged in such a manner that different voltages are generated between the connectors of the submodule in the case of actuating the semiconductor switches that can be switched off. In this case, the behavior of the power converter and of the submodule can be considerably improved in the event of failure.

What is claimed is:

1. A submodule for a modular multilevel power converter, comprising:

a first semiconductor switch, a fourth semiconductor switch and an eighth semiconductor switch forming a first series connection between a first connector and a second connector of the submodule, with the first semiconductor switch connected to the fourth semiconductor switch at a first network node, and with the fourth semiconductor switch connected to the eighth semiconductor switch at a fourth network node, the first semiconductor switch configured to disconnect a current flowing from the first network node to the first connector, the fourth semiconductor switch configured to disconnect a current flowing from the first network node to the fourth network node, and the eighth semiconductor switch configured to disconnect a current flowing from the second connector to the fourth network node;

a second semiconductor switch, a sixth semiconductor switch and a ninth semiconductor switch forming a second series connection between the first connector and the second connector and connected in parallel with the first series connection, with the second semiconductor switch connected to the sixth semiconductor switch at a second node, and with the sixth semiconductor switch connected to the ninth semiconductor switch at a fifth node, the second semiconductor switch configured to disconnect a current flowing from the second network node to the first connector, the sixth semiconductor switch configured to disconnect a current flowing from the second network node to the fifth network node, and the ninth semiconductor switch configured to disconnect a current flowing from the second connector to the fifth network node;

a third semiconductor switch, a fifth semiconductor switch and a seventh semiconductor switch forming a third series connection between the first connector and the second connector and connected in parallel with the first and the second series connection, with the third semiconductor switch connected to the fifth semiconductor switch at a third node, and with the fifth semiconductor switch connected to the seventh semiconductor switch at a sixth node, the third semiconductor switch configured to disconnect a current flowing from the first connector to the third network node, the fifth semiconductor switch configured to disconnect a current flowing from the sixth network node to the third network node, and the seventh semiconductor switch configured to disconnect a current flowing from the sixth network node to the second connector;

a first capacitor connected between the first node and the third node;

a second capacitor connected between the second node and the third node;

a third capacitor connected between the fourth node and the sixth node; and a fourth capacitor connected between the fifth node and the sixth node.

2. The submodule of claim 1, wherein the first, second, third, fourth, fifth, sixth, seventh, eighth and ninth semiconductor switches are connected so as to be able to connect and disconnect the current flow in a current flow direction, and to only conduct the current flow in a direction opposite to the current flow direction.

3. A modular multilevel power converter, comprising a plurality of the submodules of claim 1, with at least two of the plurality of the submodules connected in series to form a converter arm of the modular multilevel power converter and two converter arms connected in series at a connection point forming a converter phase, wherein the connection point forms a phase connector of the modular multilevel power converter.

4. The modular multilevel power converter of claim 3, wherein an end of the converter arm, which is remote from the phase connector, forms an intermediate circuit connector of the multilevel power converter.

5. A method for operating a submodule as claimed in claim 1, comprising generating different voltages between the first connector and the second connector by switching operations of the first, second, third, fourth, fifth, sixth, seventh, eighth and ninth semiconductor switches.

6. A method for producing a submodule as claimed in claim 1 from two part-modules, wherein a first of the two part modules comprises the first, third, fourth, fifth, seventh and eighth semiconductor switches, the first and the third capacitor and the second, third, fourth and the sixth network nodes, and wherein a second of the two part modules comprises the first, third, fifth, sixth, seventh and ninth semiconductor switches, the second and the fourth capacitor and the second, third, fifth and the sixth network nodes.

\* \* \* \* \*